W. D. BOYD.
JACK.
APPLICATION FILED SEPT. 7, 1918.
1,332,598.
Patented Mar. 2, 1920.
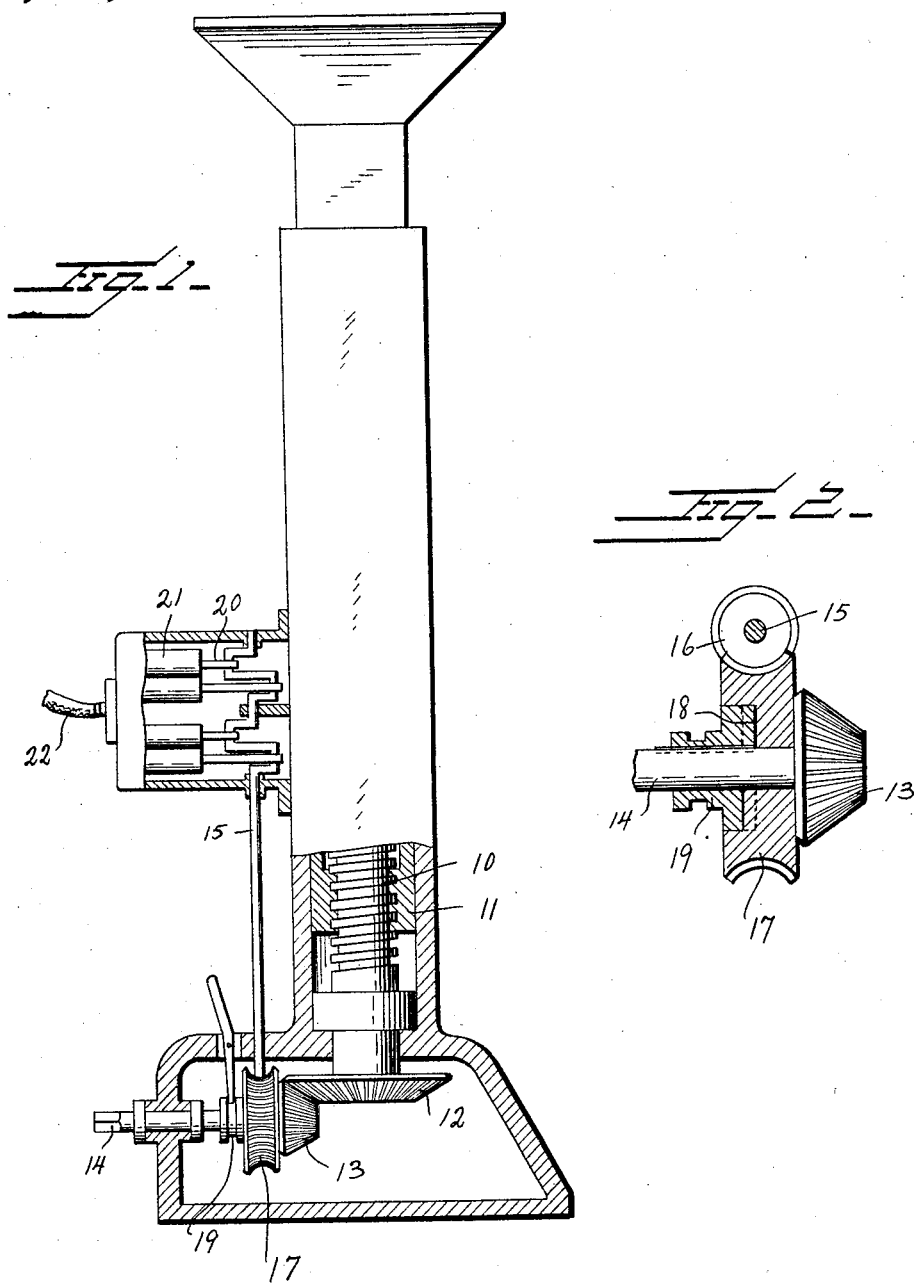
Inventor
W. D. Boyd
By Watson E. Coleman
Attorney

UNITED STATES PATENT OFFICE.

WILLIAM D. BOYD, OF JACKSON, TENNESSEE.

JACK.

1,332,598.   Specification of Letters Patent.   Patented Mar. 2, 1920.

Application filed September 7, 1918. Serial No. 253,025.

*To all whom it may concern:*

Be it known that I, WILLIAM D. BOYD, a citizen of the United States, residing at Jackson, in the county of Madison and State of Tennessee, have invented certain new and useful Improvements in Jacks, of which the following is a specification, reference being had to the accompanying drawings.

This invention relates to jacks, and particularly to jacks such as are used in railroad engineering.

The general object of the invention is to provide means whereby the jack may be operated by compressed air from any suitable source and particularly by compressed air from the engine air through the train line so that the jack may be used by the crew of a train for "brassing" the cars.

A further object is to provide means whereby the air operated power shaft may be readily connected to or disconnected from the nut or rotatable member which acts upon the screw of the jack.

Other objects will appear in the course of the following description.

My invention is illustrated in the accompanying drawings, wherein:—

Figure 1 is a side elevation of a jack constructed in accordance with my invention, the jack and its allied parts being partly in section; and Fig. 2 is a sectional view of the gear 17.

Referring to these figures, it will be seen that I have illustrated a Norton jack. This jack is of any ordinary or suitable construction and is provided with the screw-threaded lifting shaft 10 operating in a nut 11 forming part of the standard of the jack proper and rotated by means of a gear wheel 12 engaged by a gear wheel 13 mounted upon a shaft 14. Ordinarily this shaft is operated by hand. As before stated one of the objects of this invention is to provide means whereby the jack may be operated by air taken from the train line of the engine and to this end I provide a crank shaft 15 mounted in suitable bearings on the housing of the jack this crank shaft carrying a worm 16. The worm 16 operates upon a worm gear wheel 17 which is hollowed or recessed at one side this recess being provided with clutch teeth 18. Mounted upon the shaft 14 for rotation therewith but for sliding movement thereon is a clutch 19 having clutch teeth engaging with the clutch teeth 18. The clutch is shiftable into or out of engagement with the gear wheel 17 by any suitable lever or other clutch shifting mechanism.

The crank shaft 15 is provided at a plurality of points with cranks which are connected to the pitman 20 of a plurality of air motors 21 of any suitable construction. The cylinders of these motors 21 are connected by a pipe and hose connection 22 to a coupling which may be connected to the train line at any suitable point so that the engine air may be taken for use to operate the motors.

By connecting the gear wheel 17 to the shaft 14 by means of the clutch 19, it is possible to shift the clutch out of gear with the gear wheel 17 and then operate the shaft 14 by hand power in the usual manner, it being understood that the gear wheel 17 is loose on the shaft 14 so that the shaft and gear wheel rotate independently but that the clutch 19 while longitudinally shiftable on the shaft 14 is keyed, splined or otherwise connected thereto as by making the shaft 14 many-sided in cross section along that portion of the shaft upon which the clutch operates.

While I have illustrated a particular form of motor, I do not wish to be limited thereto as it is obvious that other forms of motor might be used, nor do I wish to be limited to the particular form of clutch illustrated, nor to the particular form of jack as the details of the mechanism may be modified in many ways without departing from the spirit of the invention.

It will be understood that the hose 22 is in the usual practice or operation, connected to the train line by a common air hose connection reduced to, say three-fourths of an inch.

I claim:—

1. A jack of the character described including a screw-threaded shaft, a housing therefor, a nut engaging the screw-threads of the shaft and forming part of a vertically movable standard disposed in said housing, and means for rotating the shaft including a counter-shaft, a worm gear wheel loosely mounted thereon, a manually shiftable clutch for operatively engaging the worm gear wheel with the counter-shaft, and disengaging it therefrom, a driving shaft carrying a worm engaging said worm gear wheel, and an air operated motor mounted on the housing and operatively engaged with the driving shaft to rotate it, the counter-shaft being provided with means whereby it may be manually rotated.

2. A jack of the character described including a housing, a standard slidably mounted therein and having a nut, a screw-threaded shaft mounted within the housing and engaging the nut and having a gear wheel at its lower end, a counter-shaft having a beveled gear wheel engaging the first named gear wheel and extending out of the housing and being formed to be manually rotated, a worm wheel loosely mounted on the counter-shaft, a clutch splined on the counter-shaft and manually shiftable into or out of engagement with the worm wheel, a driving shaft carrying a worm engaging the worm wheel, and an air operated motor mounted on the housing and operatively engaging the driving shaft.

In testimony whereof I hereunto affix my signature in the presence of two witnesses.

WILLIAM D. BOYD.

Witnesses:
C. E. PIGFORD.
A. O. CHALKER.